No. 611,970. Patented Oct. 4, 1898.
H. W. LEONARD.
METHOD OF AND MEANS FOR CONTROLLING ENERGY DELIVERED TO TRANSLATING DEVICES.
(Application filed Jan. 21, 1896.)
(No Model.)
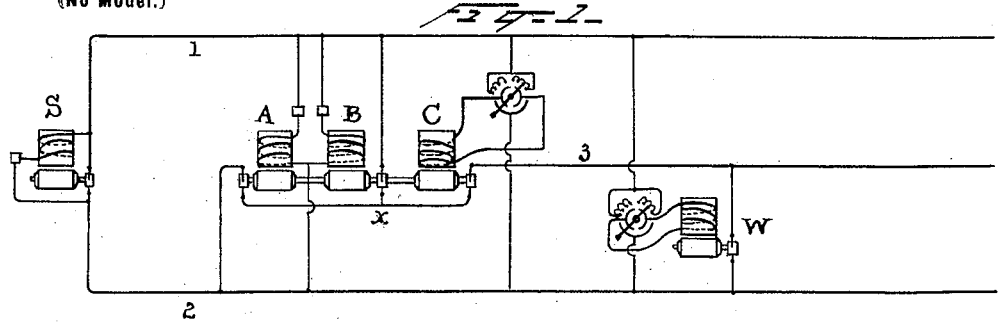
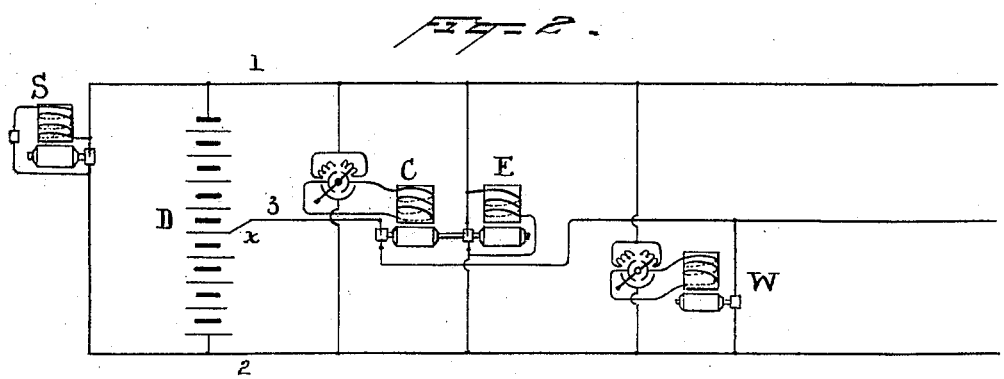
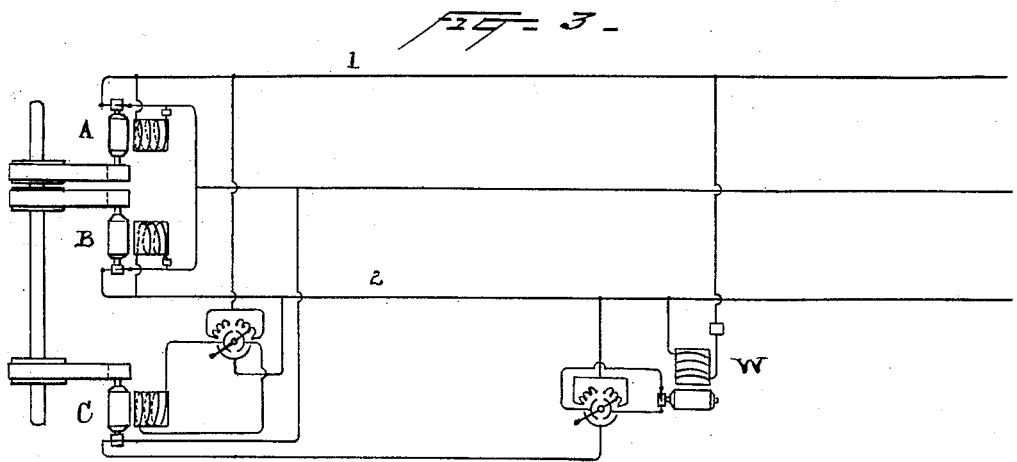
Witnesses
Norris A. Clark.
Inventor
Harry Ward Leonard
By his Attorneys Dyer & Driscoll

UNITED STATES PATENT OFFICE.

HARRY WARD LEONARD, OF EAST ORANGE, NEW JERSEY.

METHOD OF AND MEANS FOR CONTROLLING ENERGY DELIVERED TO TRANSLATING DEVICES.

SPECIFICATION forming part of Letters Patent No. 611,970, dated October 4, 1898.

Application filed January 21, 1896. Serial No. 576,289. (No model.)

*To all whom it may concern:*

Be it known that I, HARRY WARD LEONARD, a citizen of the United States, residing at East Orange, in the county of Essex and State of New Jersey, have invented a certain new and useful Improvement in Methods of and Means for Controlling the Energy Delivered to Translating Devices, of which the following is a specification.

My invention relates to the method of controlling electrical translating devices supplied from a source of constant electromotive force, and more particularly to the control of electric motors operating elevators, cranes, cars, or other machinery designed to be operated at varying speeds or at constant speed and varying torque.

The object of my invention is to provide an improved method and means for accomplishing these results.

In the accompanying drawings, which illustrate my invention, Figure 1 is a diagrammatic view illustrating my method and arrangement of apparatus for controlling a working motor. Fig. 2 is a view showing a similar method, a storage battery being substituted for part of the apparatus; and Fig. 3, a view illustrating the application of my invention to a regular three-wire system.

Referring to Fig. 1, S is the main source of supply of constant electromotive force and continuous current, and W is the working motor to be controlled and which may be employed to operate an elevator, a crane, a railway-car, or other machinery. A, B, and C are dynamo-electric machines having their armatures mechanically coupled together, the armatures of the machines A and B being connected in series across the main circuit 1 2, and the armature of the machine C is connected in series with the armature of the working motor W in a circuit 3 extending from the point $x$ of fixed potential between the armatures of the machines A and B to the wire 2 of the main circuit. The field-magnets of the machines A and B are connected across the main circuit independently of their armatures and are preferably designed to be of constant strength, although there may be cases in which it will be desirable to vary them. The field-magnet of the machine C is also connected across the main circuit independently of its armature and is designed to be of variable strength and is reversible. W is preferably of constant-field strength, but may at times be variable and reversible. The armature of the motor W is wound for the full-line electromotive force, which will be assumed to be two hundred volts, while the armatures of the machines A, B, and C are each wound for one-half-the-line electromotive force, the capacity in amperes of the machines W, A, B, and C being the same.

In Fig. 2 the machines A and B are replaced by storage batteries D, to which the wire 3 is connected at the point $x$ of fixed potential. This arrangement requires the additional machine E, the armature of which is mechanically connected with the armature of the machine C. This machine at times acts as a motor to drive the machine C when that machine acts as a generator, and at other times the machine E acts as a generator when the machine C is running as a motor.

In Fig. 3, which illustrates my invention applied to the three-wire system, the machines A and B are the main source of supply. The armature of the machine C is mechanically connected to the armatures of the machines A and B. The field-magnet of the machine C is connected across the outside conductors 1 2, and the armatures of the machines C and W are connected in series between the neutral wire and the outside conductor 2 of the three-wire system. The armature of the machine C is thus connected to a point of fixed potential, as in the arrangement shown in Figs. 1 and 2. The field-magnet of the working motor in this case is connected across the outside conductors of the main line. This arrangement is applicable in large factories or other places where a three-wire electric-light plant is installed. In theater lighting the working motor W may be replaced by lamps designed to be operated from a dull-red light to a full candle-power to produce various effects, as will be readily understood.

The operation of the apparatus will be as follows, assuming that the field-magnets of the machines A, B, C, and W are fully excited and that the machine W is at rest: Under these conditions the armatures of the machines A and B will run at full speed, as they each receive their full electromotive force in a full field. These machines will drive the armature of the machine C in a full field; but its field-magnetism is of such polarity that there is no difference of potential between the conductors 2 3. Hence the motor W will remain at rest. The potential of the point $x$ in the armature-circuit will be one hundred volts away from the conductors 1 2 of the main line, and by varying and reversing the field of the machine C the potential upon the conductor 3 can be made to vary one hundred volts each way from that at $x$—that is, the potential upon the conductor 3 can be made anything desired from the potential upon the conductor 1 to that of the conductor 2. Thus the electromotive force at the terminals of the motor W can be made anything desired from zero to two hundred volts. The direction of revolution of the motor W depends upon the direction of the current through its field-magnet, and by employing a reversing-rheostat the field-magnetism of the machine W may be reversed when there are no volts or but few volts upon its armature, and its armature thus caused to revolve in either direction at any desired speed from zero to full speed.

In the following statements of volts, amperes, and watts the conversion and fixed losses are, for the sake of simplicity, neglected.

To start the working motor and run at, say, one-twentieth of its full speed—that is, at a speed due to ten volts and at a torque due to one hundred amperes, equaling one thousand watts—there must be taken from the line through the machine B a current of one thousand watts divided by two hundred volts, equaling five amperes. The machine B then has five amperes and one hundred volts, equaling five hundred watts, as a motor, and since the current of the machine B plus that of A equals one hundred amperes hence the current of the machine A will be ninety-five amperes. Therefore the watts of the machine A will be ninety-five amperes times one hundred volts, equaling nine thousand five hundred watts, as a generator. The machine C has ninety volts and one hundred amperes as a motor, equaling nine thousand watts, and the machine B having five hundred watts, and these machines jointly drive the machine A as a generator to produce nine thousand five hundred watts, nine thousand of which are absorbed by the machine C.

If now it is desired to increase the speed of the working motor W to one-quarter of its full speed—that is, at a speed due to fifty volts and at a torque due to one hundred amperes, equaling five thousand watts—the machine C will have fifty volts and one hundred amperes as a motor, equaling five thousand watts; the machine B will have one hundred volts and twenty-five amperes as a motor, equaling two thousand five hundred watts, and the machines B and C will drive the machine A as a generator, having one hundred volts and seventy-five amperes, equaling seven thousand five hundred watts.

If the motor W receives one hundred volts and one hundred amperes, equaling ten thousand watts, there must be taken from the line fifty amperes at two hundred volts, equaling ten thousand watts. The machine B will then have one hundred volts and fifty amperes, equaling five thousand watts, as a motor; the machine A will have one hundred volts and fifty amperes, equaling five thousand watts, as a generator, the machine C having no volts and one hundred amperes.

Now supposing that the motor W has one hundred and eighty volts and one hundred amperes upon its terminals, equaling eighteen thousand watts, the machine C must produce as a generator eighty volts and one hundred amperes, equaling eight thousand watts, and we must take from the line eighteen thousand watts divided by two thousand volts, equaling ninety amperes. The machine B as a motor has ninety amperes times one hundred volts, equaling nine thousand watts, and the machine A as a generator produces ten amperes and one hundred volts, equaling one thousand watts. Thus the machine B is a motor driving the machines A and C as generators.

Now supposing the motor W to be running as a generator of one hundred and fifty volts and one hundred amperes, equaling fifteen thousand watts, this energy will be restored to the line at two hundred volts. Hence seventy-five amperes are delivered by the machine B as a generator at one hundred volts, equaling seven thousand five hundred watts generated; the machine C will have fifty volts and one hundred amperes, equaling five thousand watts, as a motor, and the machine A will have one hundred volts and twenty-five amperes, equaling two thousand five hundred watts, as a motor, so that the machines A and C as motors drive B as a generator.

When slow speed is reached in stopping, so that the motor W has fifty volts and one hundred amperes, equaling five thousand watts, the machine C must have one hundred amperes and fifty volts, equaling five thousand watts, as a generator; there must be restored five thousand watts, divided by two thousand volts, equaling 2.5 amperes. Hence the machine B has one hundred volts and twenty-five amperes, equaling two thousand five hundred watts as a generator, and hence the machine A must have seven thousand five hundred watts as a motor.

When the reversing-rheostat of the machine C is in the position at which the motor W is at rest, or, in other words, with no volts at its terminals, the operation of the rheostat in the machine W in the reverse direction will reverse the field of the motor W, so that when the field of the machine C is again strengthened the motor W will run in the reverse direction.

What I claim is—

1. The method of varying the electromotive force upon the terminals of a translating device, which consists in developing independently of the main source a divided electromotive force between two constant potentials, and developing a variable electromotive force in another electromotive-force-producing device connected to the point of division of said divided electromotive force and also to one terminal of the translating device, the other terminal of the translating device being connected to one of the said points of constant potential.

2. The method of operating an electric motor at a variable speed when connected to a source of constant electromotive force and continuous current, which consists in developing independently of the main source a divided electromotive force across the circuit of constant electromotive force and developing a variable electromotive force in another electromotive-force-producing device which is connected between the point of division of said divided electromotive force and one pole of the electric motor, whose other pole is connected to one pole of the source of constant electromotive force.

3. In a system of electrical distribution, the combination with the main conductors each having a practically constant but different potential, an electromotive-force-producing device connected therewith which develops a constant intermediate potential, a variable-electromotive-force-producing device having one terminal connected to the constant intermediate potential, and a conductor extending from the other terminal of said variable-electromotive-force-producing device, between which and one of the main conductors translating devices are adapted to be connected, substantially as set forth.

4. In a system of electrical distribution, the combination with the main conductors each having a practically constant but different potential, an electromotive-force-producing device connected therewith which develops a constant intermediate potential, a variable and reversible electromotive-force-producing device having one terminal connected to the constant intermediate potential, and a conductor extending from the other terminal of said electromotive-force-producing device, between which and one of the main conductors translating devices are adapted to be connected, substantially as set forth.

5. In a system of electrical distribution, the combination with the main conductors each having a practically constant but different potential, an electromotive-force-producing device connected therewith which develops a constant intermediate potential, a variable-electromotive-force-producing device having one terminal connected to the constant intermediate potential, and a conductor extending from the other terminal of said variable-electromotive-force-producing device, between which and one of the main conductors the armature of a motor is adapted to be connected and whose field is connected across the main conductors, substantially as set forth.

6. In a system of electrical distribution, the combination with a main source of supply and the conductors extending therefrom, of two dynamo-electric machines whose armatures are connected in series across the main circuit and producing a divided source of electromotive force, a variable-electromotive-force-producing device having one of its terminals connected to the point of division of said divided source, and a conductor extending from the other terminal of said device between which and one of the main conductors translating devices are adapted to be connected, substantially as set forth.

7. In a system of electrical distribution, the combination with a main source of supply and the conductors extending therefrom, of two dynamo-electric machines whose armatures are mechanically coupled together and connected in series across the main circuit and producing a divided source of electromotive force, a variable-electromotive-force-producing device having one of its terminals connected to the point of division of said divided source, a conductor extending from the other terminal of said device between which and one of the main conductors translating devices are adapted to be connected, substantially as set forth.

8. In a system of electrical distribution, the combination of three dynamo-electric machines having their armatures mechanically coupled together, two of said armatures being electrically connected in series and producing a divided source of electromotive force, the armature of the third dynamo-electric machine being connected in series with a translating device between the point of division of said divided source of electromotive force and one of the main conductors, and the field-winding of said third dynamo-electric machine being variable and reversible, substantially as set forth.

9. In a system of electrical distribution, the combination of three dynamo-electric machines having their armatures mechanically coupled together, two of said armatures being electrically connected in series and producing a divided source of electromotive force, the armature of the third dynamo-electric machine being connected in series with the armature of a working motor between the point of division of said divided source of electromotive force and one of the main conductors, the field-winding of said third dynamo-electric machine being variable and reversible, and means for controlling the direction of rotation of the working-motor armature, substantially as set forth.

This specification signed and witnessed this 17th day of January, 1896.

H. WARD LEONARD.

Witnesses:
 W. PELZER,
 EUGENE CONRAN.